A. Soule.
Mower.
No. 90,697  Patented June. 1. 1869
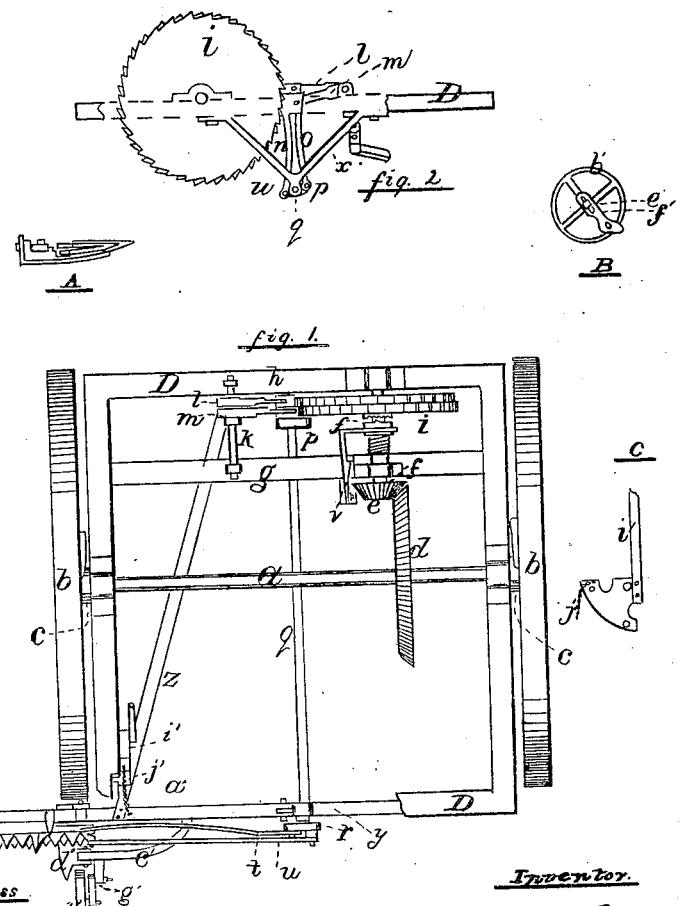
Witness
Wm Franklin Halsey
Henry C. Houston
Inventor.
Alvin Soule
Per W A Clifford Atty.

UNITED STATES PATENT OFFICE.

ALVIN SOULE, OF YARMOUTH, MAINE.

IMPROVEMENT IN MOWING-MACHINES.

Specification forming part of Letters Patent No. 90,697, dated June 1, 1869.

*To all whom it may concern:*

Be it known that I, ALVIN SOULE, of Yarmouth, in the county of Cumberland and State of Maine, have invented a new and useful Improved Mower; and I hereby declare the following to be a full, clear, and exact description thereof, which will enable others to make and use my invention, reference being had to the accompanying drawings, forming part of this specification, in which—

Figure 1 is a top plan. Fig. 2 is an end view of the wheel from which motion is communicated to the cutters.

A is a side view of one of the shoes in which the cutters slide. B is a wheel in front of the inner end of the cutters. C is a lever to lift up the cutters.

My invention consists of a new and useful method of actuating double and reciprocating cutters of a mowing-machine.

It also consists in a wheel or truck connected to the cutter-frame, as hereafter set forth.

A more particular description can be given by reference to the accompanying drawings.

D shows the frame of the machine, which is borne upon the axle $a$. The revolution of the carriage-wheels $b\ b$ communicates motion to the axle by the ratchets $c\ c$, and pawls catching the same, in the manner employed in many machines of the kind.

Rigidly attached to the axle $a$ is the large bevel-gear $d$, which matches a smaller bevel-gear, $e$. Both these gears revolve in vertical planes; but the gears and the planes of revolution are at right angles to each other, as illustrated in the drawing.

Rigidly connected with the smaller gear $e$ is the horizontal shaft $f$, at right angles to the carriage-axle, and set on the two cross-pieces, $g\ h$, of the carriage-frame. On this shaft $f$ is the large wheel $i$, with two rows of alternate teeth or ratchets. (Seen in Fig. 2.) This wheel is free on the shaft, and is only revolved by the shaft when caught by the clutch $j$, hereafter to be described.

$k$ shows a short shaft set on the cross-bars $g\ h$, and having loosely set on it the two short horizontal arms $l\ m$. These are jointed to the two vertical arms $n\ o$. These combined horizontal and vertical arms are alternately pressed downward by the teeth of the wheel $i$, which teeth strike the ends of the horizontal arms $l\ m$. These teeth, being arranged as before described, force these arms downward alternately.

The lower ends of the vertical arms $n\ o$ are connected to a crank or arm, $p$, rigidly fastened to the shaft $q$. Thus by the motion of the arms $n\ o$ a circular and reciprocating motion is imparted to the shaft. This shaft $q$ extends to the front of the machine, and has at its front end the crank or arm $r$, rigidly connected with said shaft. This arm, like $p$, being thus connected to the shaft at the middle of the arm, imparts an alternate reciprocating motion to the two arms $t\ u$, which are pivoted to the ends of said crank. These arms carry the cutters, two in number, placed one above another, and moving or sliding horizontally, as common, but in different directions, so that the cutting of the grass is effected by the stalks being severed between the two sets of upper and lower teeth approaching each other and coming together, or so that one is over the other.

The peculiarity of the cutters is that they both move simultaneously in opposite directions, cutting the grass between them. With such an arrangement there is little danger of the teeth becoming clogged, which is a common failing with many machines where a single moving cutter is used, which severs the grass by passing it between certain fixed metal edges in the shoes through which the cutter slides and the knives.

There are no fixed knives or cutters in my machine, but the two sets of knives, one above the other, slip by each other in both directions and cut the grass between them. Thus the length of sweep of the knives is diminished one-half in consequence of there being two, which approach each other. The cutters are set in slitted shoes, as common, and slip through the same. These knives can be taken out for grinding, but the fixed knives in others cannot, and in consequence become dulled.

My method of actuating the cutters by the employment of the shaft with its cranks at each end, is quite advantageous. The shaft does not make a complete revolution, but vibrates backward and forward in an arc of a circle more or less extended. Thus there are in its motion no dead-points, but one or the other of the vertical levers $n\ o$ is continually operating upon it.

The clutch $j$, operated by lever $v$, controls the motion of the cutters, even when the carriage is in motion, as illustrated in Fig. 1. When drawn back, the motion of the smaller gear $e$ is not imparted to the wheel $i$.

The shaft $q$ is held at the rear end of the carriage by braces $w\ x$, and at the front is set into the inclined support $y$, and projects in front of the same, so as to connect by its arms with the cutters. The piece $y$ is secured to the under side of the front of the carriage, and has joints to allow the cutters to be turned up, as common.

The cutters and their carrier are kept in position by the diagonal brace $z$, connected with $y$ at $a'$, and fastened by a joint connection at the rear of the carriage, so as to admit of the necessary motion in the arms that support the cutters and connect them with the carriage.

In front of the cutters, at the end next to the carriage, is set the wheel $b'$, which supports the cutter-carriers at a proper position as they pass along the field. This wheel is set onto an arm projecting from the brace-iron $c'$, which iron is jointed to the shoe $d'$ at the end of the cutter-carriers. The elevation of the cutter-carriers is regulated and adjusted by the wheel $b'$ with the stud and slot $e'\ f'$. (See B.)

The arm projecting from the brace $c'$ is jointed at $g'$, to enable the wheel to be turned downward when the cutters are lifted from the grass, as otherwise the shoe would strike the side of the wheel when the cutter was raised.

It will be observed that with my machine I am enabled to employ the large wheels $b$, which give greater leverage and consequent ease to the operation of mowing with the machine.

The lever $i'$, with its sector attached, is pivoted to the inside of the frame of the machine, and is employed to elevate the cutters and their connecting parts by the band $j'$ passing around the sector in a groove as the lever is thrown back. Certain studs passing over a lip on the inside of the frame will hold the lever and its weight, and the same can be thrown off by tipping the lever sidewise, which can be done by reason of the length of the pivot on which it moves.

What I claim as my invention, and desire to secure by Letters Patent, is—

1. The combination of wheel $i$, arms $l\ o\ m\ n$, with crank-shaft $q$ and arms connecting it with the cutters, as herein set forth.

2. The arrangement of wheels $b$, shaft $a$, gears $d\ e$, wheel $i$, arms $l\ m\ n\ o$, and crank-shaft $q$, as herein described and set forth.

3. The arrangement of brace $c'$ and arm jointed at $g'$, to prevent the shoe from striking the wheel $b'$ when the cutters are raised, as herein illustrated as described.

ALVIN SOULE.

Witnesses:
W. H. CLIFFORD,
WM. FRANKLIN SEAVEY.